United States Patent [19]

Greaves et al.

[11] Patent Number: 5,587,109
[45] Date of Patent: Dec. 24, 1996

[54] METHOD FOR INHIBITION OF OXYGEN CORROSION IN AQUEOUS SYSTEMS BY THE USE OF A TANNIN ACTIVATED OXYGEN SCAVENGER

[75] Inventors: Brian Greaves, Runcorn; Stephen C. Poole, Newton-Le-Willows, both of England; Chih M. Hwa, Palatine; Joseph C. Fan, Lake Zurich, both of Ill.

[73] Assignee: W. R. Grace & Co.-Conn., New York, N.Y.

[21] Appl. No.: 426,162

[22] Filed: Apr. 19, 1995

Related U.S. Application Data

[62] Division of Ser. No. 107,550, Aug. 17, 1993, abandoned.

[30] Foreign Application Priority Data

Aug. 17, 1992 [GB] United Kingdom .................... 9217448

[51] Int. Cl.⁶ .............................. C23F 11/12; C23F 11/16
[52] U.S. Cl. .......................... 252/392; 252/393; 252/395; 252/389.54; 252/188.28; 422/12; 422/13; 422/16; 422/19
[58] Field of Search ................................. 252/188.28, 392, 252/394, 395, 389.54; 422/12, 13, 16, 19

[56] References Cited

U.S. PATENT DOCUMENTS

| | | | |
|---|---|---|---|
| 3,352,793 | 11/1967 | Robertson | 252/389.5 |
| 3,639,263 | 2/1972 | Troscinski et al. | 252/389.52 |
| 3,723,347 | 3/1973 | Mitchell | 252/389.22 |
| 3,879,288 | 4/1975 | Siegele | 210/701 |
| 3,928,211 | 12/1975 | Browning et al. | 507/145 |
| 3,931,038 | 6/1976 | Mochi-Bartolani et al. | 252/181 |
| 4,067,690 | 1/1978 | Cuisia et al. | 21/27 R |
| 4,094,701 | 6/1978 | Fekete | 134/2 |
| 4,190,463 | 2/1980 | Kaplan | 134/3 |
| 4,350,606 | 9/1982 | Cuisia et al. | 252/392 |
| 4,487,745 | 12/1984 | Weiss et al. | 422/16 |
| 4,541,932 | 9/1985 | Muccitelli | 210/750 |
| 4,569,783 | 2/1986 | Muccitelli | 134/3 |
| 4,626,411 | 12/1986 | Nemes et al. | 422/13 |
| 4,629,613 | 12/1986 | Grosskinsky et al. | 423/265 |
| 4,681,737 | 7/1987 | Walker et al. | 422/16 |
| 4,689,201 | 8/1987 | Longworth et al. | 422/16 |

(List continued on next page.)

FOREIGN PATENT DOCUMENTS

| | | |
|---|---|---|
| 0283243 | 9/1988 | European Pat. Off. . |
| 0297916 | 1/1989 | European Pat. Off. . |
| 2617813 | 8/1977 | Germany . |
| 3001505 | 8/1980 | Germany . |

OTHER PUBLICATIONS

Database WPI Derwent Publication: (Egorova LG), Molybdenum Coatings on Aluminum Surfaces, Abs. No. 75-35449W & SU-A-406 967, Jun. 6, 1974, Abstract Only.
Database WPI Derwent Publication: (Yazaki Corp.), Solution For Absorption Refrigeration Machine, Abs. No. 89-268371, JP-A-1 196 463, Aug. 8, 1989—Abstract Only.
Patent Abstracts of Japan vol. 13, No. 61 (C-567) (3409), Mitsubishi Heavy Ind. Ltd., Feb. 10, 1989 & JP-A-63 250 476, Oct. 18, 1988—Abstract Only.

*Primary Examiner*—Sharon Gibson
*Assistant Examiner*—Valerie D. Fee
*Attorney, Agent, or Firm*—Howard J. Troffkin

[57] ABSTRACT

A method of treating an aqueous system is described which comprises incorporating in the system a hydroxylamine derivative of the general formula:

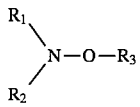

wherein each of $R_1$, $R_2$ and $R_3$ which may be the same or different represents hydrogen, alkyl of 1 to 8 carbon atoms or aryl or a water soluble salt thereof or a precursor thereof, and a tannin in a weight ratio of at least 2:1. This is particularly useful for boiler water systems.

14 Claims, 9 Drawing Sheets

U.S. PATENT DOCUMENTS

| | | | |
|---|---|---|---|
| 4,789,406 | 12/1988 | Holder et al. | 134/3 |
| 4,810,405 | 3/1989 | Waller et al. | 252/81 |
| 4,847,001 | 7/1989 | Cuisia et al. | 252/389.62 |
| 4,895,703 | 1/1990 | Zupanovich et al. | 422/14 |
| 4,913,822 | 4/1990 | Chen et al. | 210/699 |
| 4,929,364 | 5/1990 | Reardon et al. | 210/750 |
| 4,975,219 | 12/1990 | Soto et al. | 252/388 |
| 4,980,128 | 12/1990 | Cuisia et al. | 422/16 |
| 5,037,483 | 8/1991 | Dubin | 134/3 |
| 5,094,814 | 3/1992 | Soderquist et al. | 422/16 |
| 5,167,835 | 12/1992 | Harder | 210/750 |
| 5,176,849 | 1/1993 | Hwa et al. | 252/392 |
| 5,194,223 | 3/1993 | Moulton et al. | 422/16 |
| 5,223,146 | 6/1993 | Kren | 210/698 |
| 5,252,486 | 10/1993 | O'Lear et al. | 436/52 |
| 5,256,311 | 10/1993 | Rossi et al. | 210/750 |
| 5,271,862 | 12/1994 | Freese | 252/181 |
| 5,294,371 | 3/1994 | Clubley | 252/389.23 |

METHOD FOR INHIBITION OF OXYGEN CORROSION IN AQUEOUS SYSTEMS BY THE USE OF A TANNIN ACTIVATED OXYGEN SCAVENGER

This is a division of application Ser. No. 08/107,550, filed Aug. 17, 1993, now abandoned.

This invention relates to a method of retarding or controlling corrosion in aqueous systems, especially boiler water systems, due to dissolved oxygen.

Dissolved oxygen is objectionable in water used for industrial purposes because of the corrosive effect on ferrous and yellow metals with which the water comes into contact. In cold and hot water lines, failure may occur in the piping and the lines may become blocked with the products of corrosion. "Red water" and iron stains may result caused by iron brought into solution by the corrosive attack of dissolved oxygen. It is well known that increased temperatures and low pH values accelerate oxygen attack.

In boiler systems dissolved oxygen is a principal factor influencing corrosion of metals which make up feed lines, heaters, economisers, boilers, and steam and return lines.

It is known to utilise oxygen scavengers for the purpose of eliminating the dissolved oxygen. These include sodium sulphite, hydrazine as well as hydroxylamine and derivatives. It will be appreciated that there are advantages in using a volatile oxygen scavenger i.e. one which does not result in any solid residues.

While sodium sulphite has been used for many years in low pressure boilers it cannot be used satisfactorily in high pressure boilers because it tends to decompose giving rise to acidic gases, principally sulphur dioxide and hydrogen sulphide which can give rise to corrosion. While hydrazine overcomes this difficulty it is a toxic chemical so that special precautions have to be taken over its use. More recently, therefore, use has been made of certain hydroxylamine derivatives, in particular N,N-diethylhydroxylamine. However, the use of such derivatives is not entirely satisfactory under all conditions because at relatively low temperatures its reaction with dissolved oxygen is rather slow. This becomes a particular problem when the derivative is added, as is normal, to the feed line in order to prevent corrosion in the boiler. Addition of the derivative to the steam and return lines is generally less of a problem because the temperatures are higher.

The present invention is based on the surprising finding that the oxygen scavenging activity of hydroxylamine and its derivatives can be catalysed by the presence of small amounts of a tannin. Accordingly the present invention provides a method for the treatment of an aqueous system which comprises incorporating in the system a hydroxylamine derivative of the general formula:

wherein each of $R_1$, $R_2$ and $R_3$ which may be the same or different, represents hydrogen, alkyl of 1 to 8 carbon atoms or aryl; such as, hydrogen, ethyl, isopropyl, phenyl, benzyl or tolyl, or a water soluble salt thereof; such as, a chloride, sulphate, acid sulphate, phosphate or sulphite, or a precursor thereof and a tannin in a weight ratio of at least 2:1.

Preferred hydroxylamine derivatives include those in which at least one of $R_1$, $R_2$ and $R_3$ represents hydrogen, ethyl or isopropyl. Specific preferred compounds include hydroxylamine, N,N-diethylhydroxylamine (DEHA) and N-isopropyl hydroxylamine (NIPHA). These compounds have the ability to passivate a boiler metal; it is believed that they do so by generating magnetite. In some circumstances it can be advantageous to use a mixture of hydroxylamine derivatives, typically a mixture of DEHA and NIPHA since they complement each other in their activity. Thus the NIPHA or other N-hydrocarbylhydroxylamines scavenge oxygen faster than the DEHA or other N,N-di-hydrocarbylhydroxylamines. As a result it is possible to use less of the tannin activator and the feed line can be scavenged of oxygen by the NIPHA (under relatively mild conditions), leaving most of the DEHA to volatilise in the boiler and pass through into the steam lines where it can scavenge oxygen. In general the weight ratio of the two types of derivative will be from 7:1 to 1:7, especially 3:1 to 1:3.

By a "precursor" we mean a compound which converts to a hydroxylamine derivative in the system. Typical examples of such precursors include oximes which are converted in the boiler to hydroxylamine. These will generally have the formula:

where $R_1$ and $R_2$ are as defined above; specific examples include methylethylketoxime, acetaldoxime, butyraldoxime and propionaldoxime.

Other precursors include the nitrones which generally have the formula:

in which $R_1$ and $R_2$ each independently represent hydrogen, alkyl of 1 to 8 carbon atoms or aryl and $R_3$ represents a hydrocarbon group of 1 to 10 carbon atoms; such as, a saturated or unsaturated aliphatic acyclic or cyclic group, an aryl group or an aralkyl group, or a water soluble salt thereof. Specific examples include formaldehyde isopropylnitrone, formaldehyde ethylnitrone, acetaldehyde isopropylnitrone, acetaldehyde ethylnitrone, acetone isopropylnitrone and acetone ethylnitrone. Further details of the use of such nitrones can be found in EP-A-283243, to which reference should be made for further details.

References hereafter to hydroxylamine derivatives should therefore be interpreted as including the precursors as well.

Tannins are a large group of water-soluble, complex organic compounds which can be obtained from the various wood and vegetation materials found throughout the world. Almost every tree or shrub that grows contains some tannins in the leaves, twigs, barks, wood or fruit. Examples of barks are wattle (or mimosa), mangrove, oak, eucalyptus, hemlock, pine, larch and willow, Examples of woods are quebracho, chestnut, oak and urunday. Examples of fruits are myrobalans, valonia, divi-divi, tara and algarrobilla. Examples of leaves are sumac and gambier and examples of roots are canaigre and palmetto. Among the preferred materials is the quebracho wood. A spray-dried quebracho powder is commercially available.

These natural tannins can be categorised into the traditional "hydrolyzable" tannins and "condensed tannins" as disclosed by A. Pizzi in "Condensed Tannins for Adhesives", *Ind. Eng. Chem. Prod. Res. Dev.* 1982, 21, 359–369. Condensed tannin extracts include those manufactured from the bark of the black wattle tree (or mimosa tannin of commerce), from the wood of the quebracho tree (Spanish: Quebra haca, axe-breaker,) from the bark of the hemlock tree, and from the bark of several commonly used pine species. The preparation of wattle (mimosa) and quebracho extracts is a well established industrial practice and such extracts are freely available in considerable amounts, as are extracts from chestnut.

While hydrolyzable tannins are generally mixtures of simple phenols and esters of a sugar, condensed tannin extracts, such as wattle and quebracho, are composed of approximately 70% polyphenolic tannins, 20% to 25% non-tannins, mainly simple sugars and polymeric carbohydrates (hydrocolloid gums), the latter of which usually constitute 3% to 6% of the extract and heavily contribute to extract viscosity, while the balance is accounted for by a low percentage of moisture. Although the exact structure is not known, it is believed that the main polyphenolic pattern in quebracho tannins is represented by flavenoid analogues based on resorcinol A and pyrogallol B rings as shown in formula 1 below:

I

Preferred tannins for use in the present invention are those derived from mimosa, chestnut and quebracho with tannins derived from mimosa being most preferred.

It will be understood that the natural tannin may be replaced in whole or in part by a synthetic tannin or tannin derivative, in particular synthetic tannins whose structure contains functionalities of phloroglucinol, resorcinol, catechol and pyrogallol, for example Resorcinex 9901L obtainable from Advance Resin Systems. Sulphonated synthetic tannins have been found to be particularly effective. Sulphonated Resorcinex 9901 L is believed to have the structure:

In this connection it should be stated that the use of sulphonated tannins in the control of corrosion is believed to be novel and this, i.e. without the necessity of using a hydroxylamine as well, forms another aspect of the present invention.

While it is known that tannins have some ability to prevent corrosion of yellow metal such as copper (various vegetable tannins can absorb oxygen and react with iron to form a protective iron tannate film), it is surprising that they have a catalytic effect on the action of the hydroxylamines to eliminate oxygen. Thus the use of the combination of hydroxylamine derivative and tannin results in faster scavenging and is effective at signficantly lower temperatures than the use of hydroxylamine derivatives alone. While it is possible to incorporate the derivatives separately it is generally more convenient to add them together. Accordingly, the present invention also provides a composition suitable for addition to an aqueous system which comprises a hydroxylamine derivative having the general formula defined above or a water soluble salt thereof or a precursor thereof and a tannin.

The amounts of hydroxylamine derivative used in the present invention will depend on the amount of dissolved oxygen in the system. In general 1 to 70 parts of hydroxylamine derivative are used per part of oxygen, more particularly to 2 to 20 parts. Preferred amounts are about 4 parts in the case of DEHA and 7 parts in the case of NIPHA.

The weight ratio of hydroxylamine derivative to tannin will in general be from 2:1 to 200:1, preferably 2:1 to 40:1 and especially 3:1 to 20:1. The preferred weight ratio is about 4:1.

In the formulation the amount of hydroxylamine derivative will generally be from 5 to 50% by weight, especially 10 to 30% by weight and more especially 15 to 25% by weight, with corresponding concentrations of the tannin. With the preferred ratio the most preferred composition contains about 20% by weight of hydroxylamine derivative and about 5 weight % of tannin.

It will be appreciated that the compositions will normally take the form of aqueous solutions.

The method of the present invention is particularly useful for dosing feed lines where the temperatures are relatively low, typically from 5° to 120° C., generally from 15° to 80° C., and especially from 20° to 75° C. The products can, though, also be added directly to the boiler or to the condensate and return lines although the effectiveness varies with the precise hydroxylamine derivative employed. In particular DEHA can be used in the condensate lines having volatilised in the boiler. On the other hand NIPHA will tend to decompose more readily in the boiler and it will not, therefore, generally be useful to add NIPHA and tannin to the boiler.

It will be appreciated that the boiler water systems can also have included small amounts of additives normally used for the control of corrosion, scaling, sedimentation, and hardeners as well as pH control. In connection with the latter the boiler water will normally be kept at a pH from 8 to 13 while the pH of the feed will generally be from 7 to 10.5 and more particularly from 8.5 to 9.5. In fact it has been found that a high pH results in a faster oxygen removal rate. A pH of 8 to 12 is generally preferred in the boiler. Particular additives which may be included to advantage are neutralising amines; typical examples of these are cyclohexylamine, butanolamine, morpholine, monoethanolamine, dimethylaminothanol, methoxypropylamine and dimethylaminopropylamine. Other useful additives include the molybdates, such as sodium molybdate.

Indeed it has also been found that the combination of hydroxylamine derivative (as defined above) and molybdate is synergistic and this forms another aspect of the present invention.

The further Examples further illustrate the present invention:

EXAMPLES

The following tests carried out on a laboratory recirculating rig illustrate the very good oxygen scavenging, and hence oxygen corrosion inhibition, which can be obtained using a blend of hydroxylamine derivative and tannin.

| Test Conditions | |
|---|---|
| System water | Demineralised water |
| pH | 10.5 |
| Temperature | 50° C. |
| Flow rate of water past probe head | 200 mls/min |
| Stirring rate | 400 revs/min |
| Duration of test | 120 secs |
| Concentration of oxygen scavenger in reaction flask | 50 ppm Active (DEHA or NIPHA) |
| Concentration of activator in reaction flask | 12.5 ppm Active (MIMOSA Tannin) |
| Total blend concentration in reaction flask | 62.5 ppm Active (DEHA or NIPHA + Mimosa Tannin) |

Figure 1:
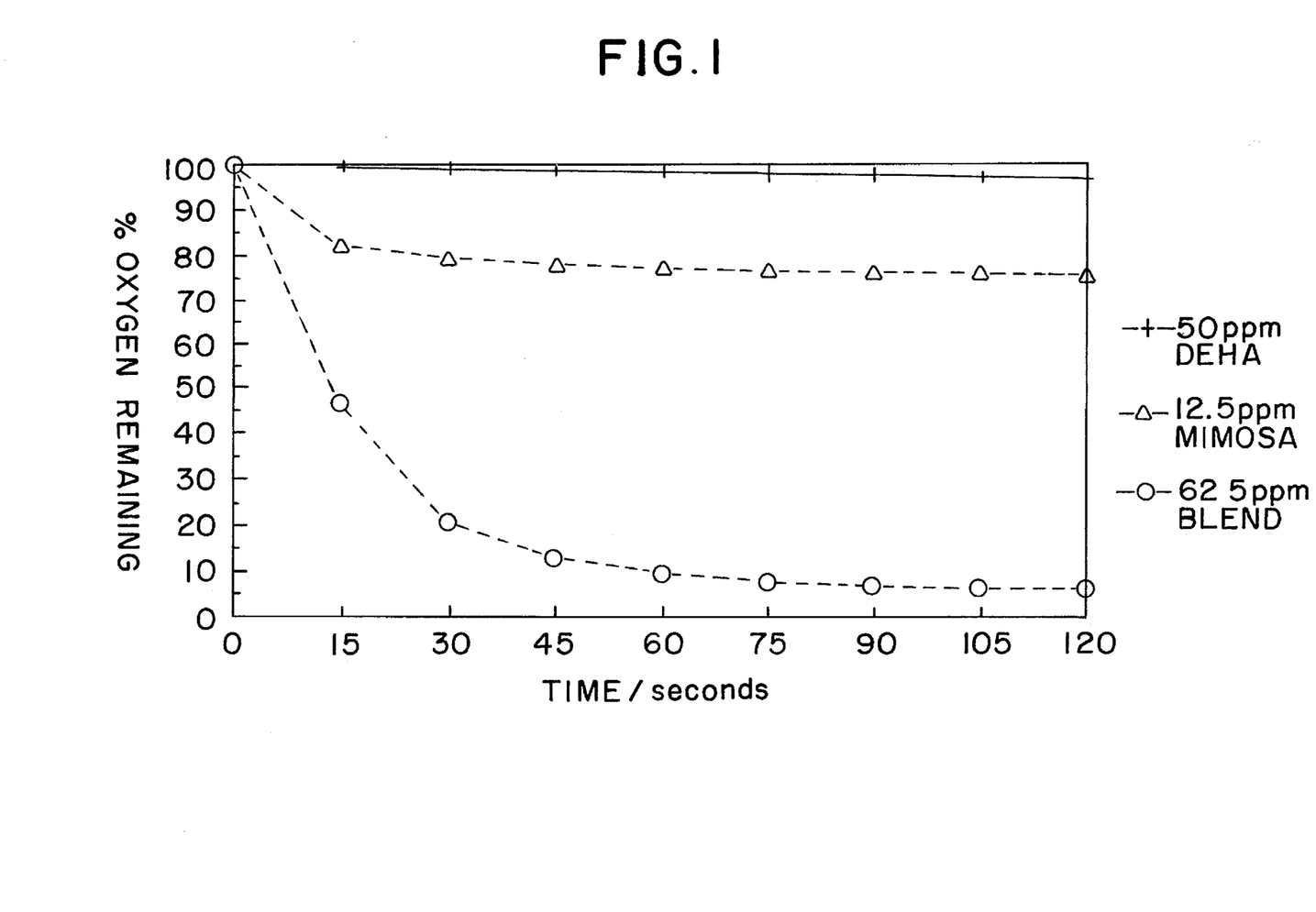
FIG. 1 illustrates the synergistic interaction between DEHA and Mimosa tannin.
Figure 2:
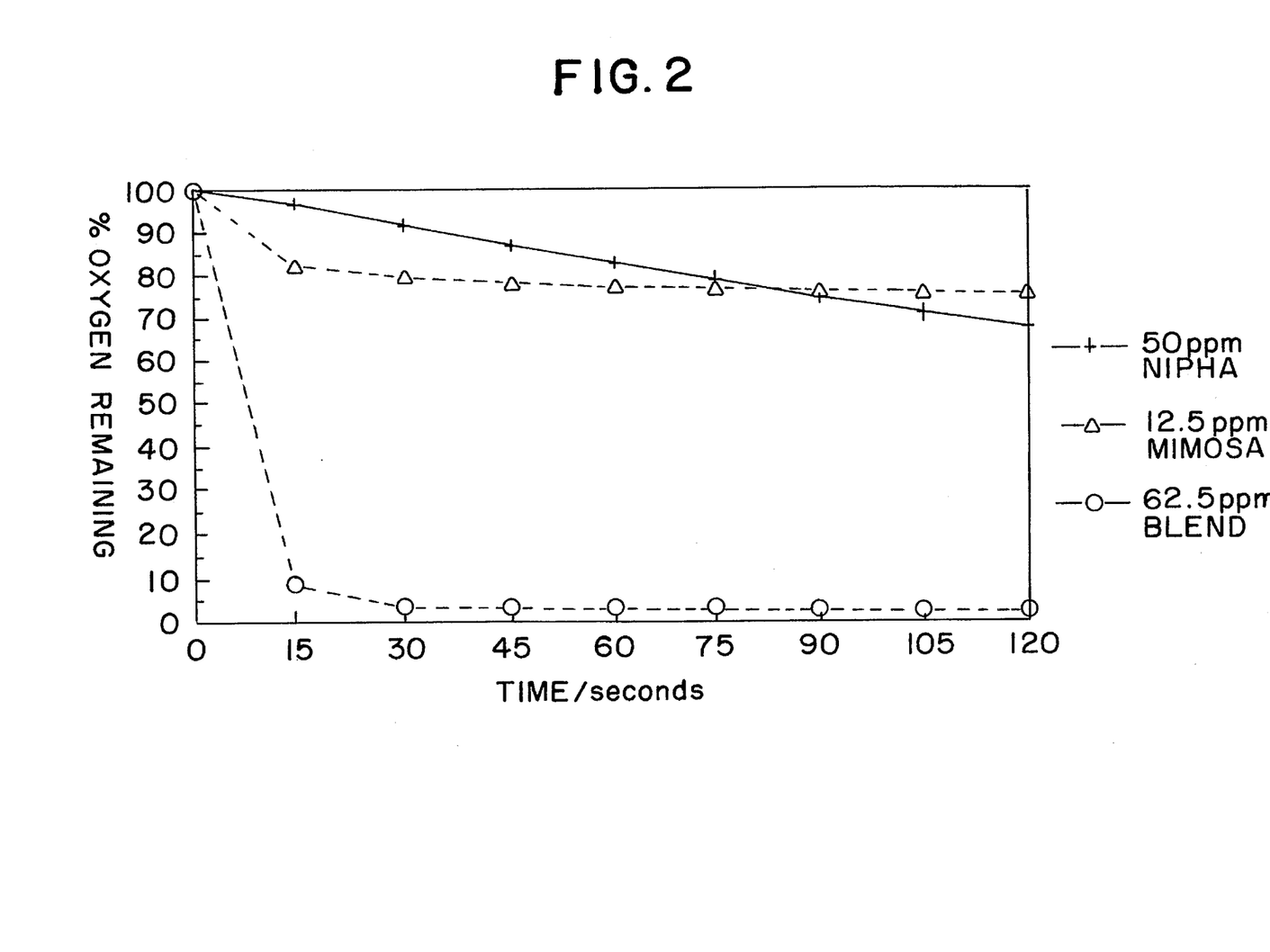
FIG. 2 illustrates the synergistic interaction between NIPHA and Mimosa tannin.
Figure 3:
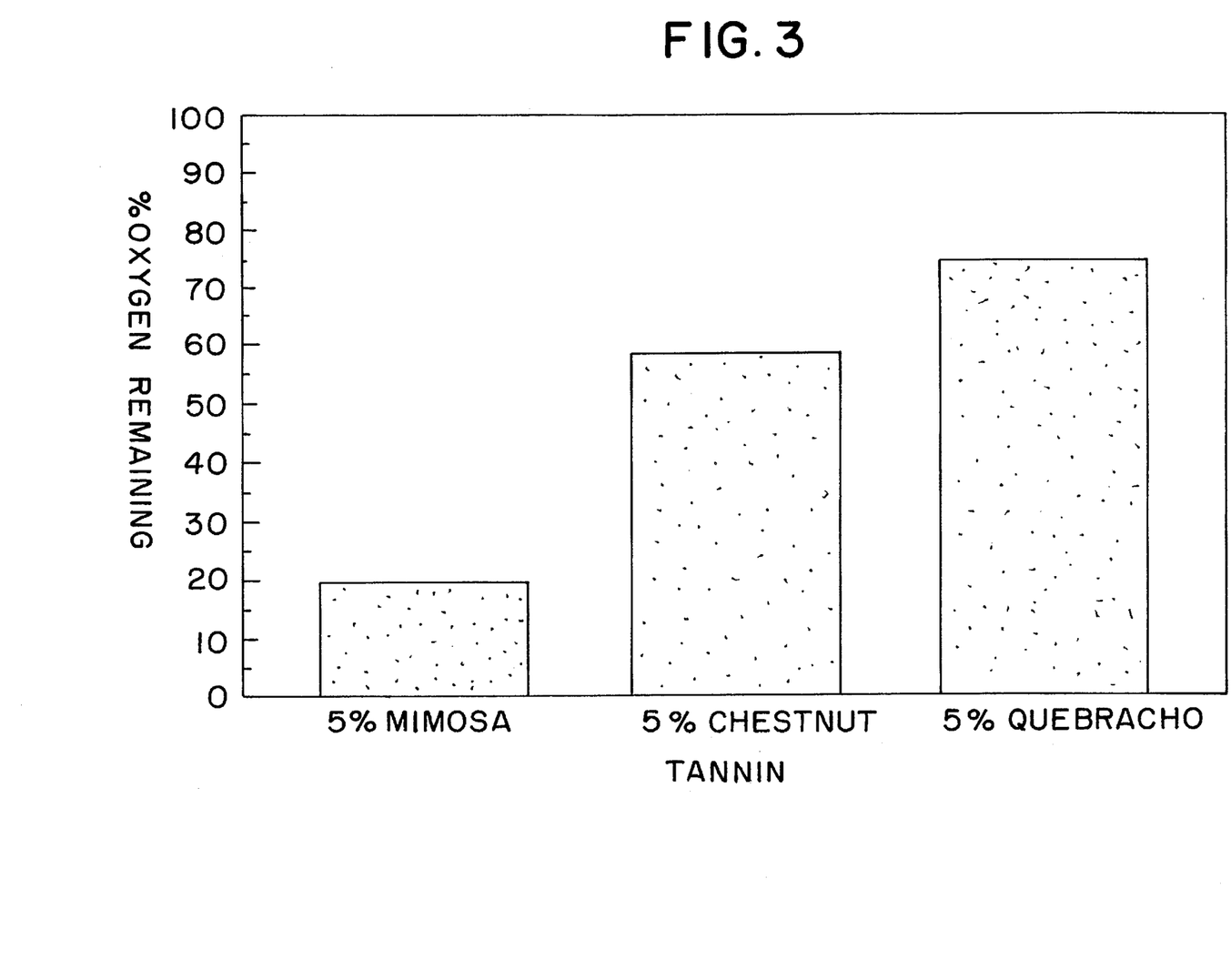
FIG. 3 shows that Mimosa tannin is more effective than tannin derived from chestnut and from quebracho as an activator for DEHA.
Figure 4:
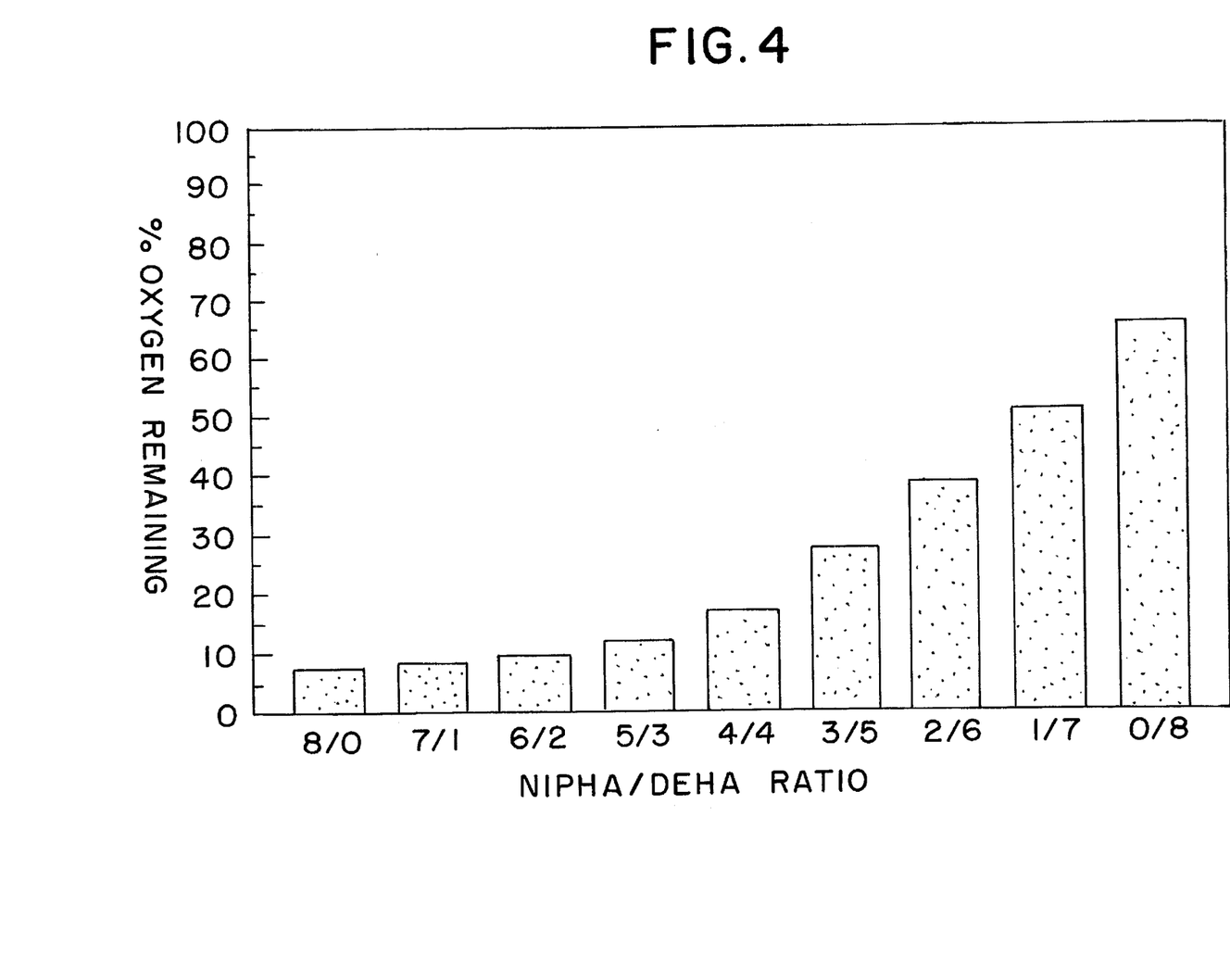
FIG. 4 illustrates the effectiveness of Mimosa tannin with various blends of NIPHA with DEHA using 20% by weight of DEHA and 1% by weight of activator.

FIGS. 1 and 2 illustrate the synergism that exists between oxygen scavenger and activator. FIG. 3 shows that Mimosa tannin is more effective than tannin derived from chestnut and from quebracho as an activator for DEHA. FIG. 4 illustrates the effectiveness of Mimosa tannin in various blends of NIPHA with DEHA using 20% by weight of DEHA and 1% by weight of activator. FIGS. 3 and 4 illustrate the % oxygen remaining after 45 seconds.

Figure 5:
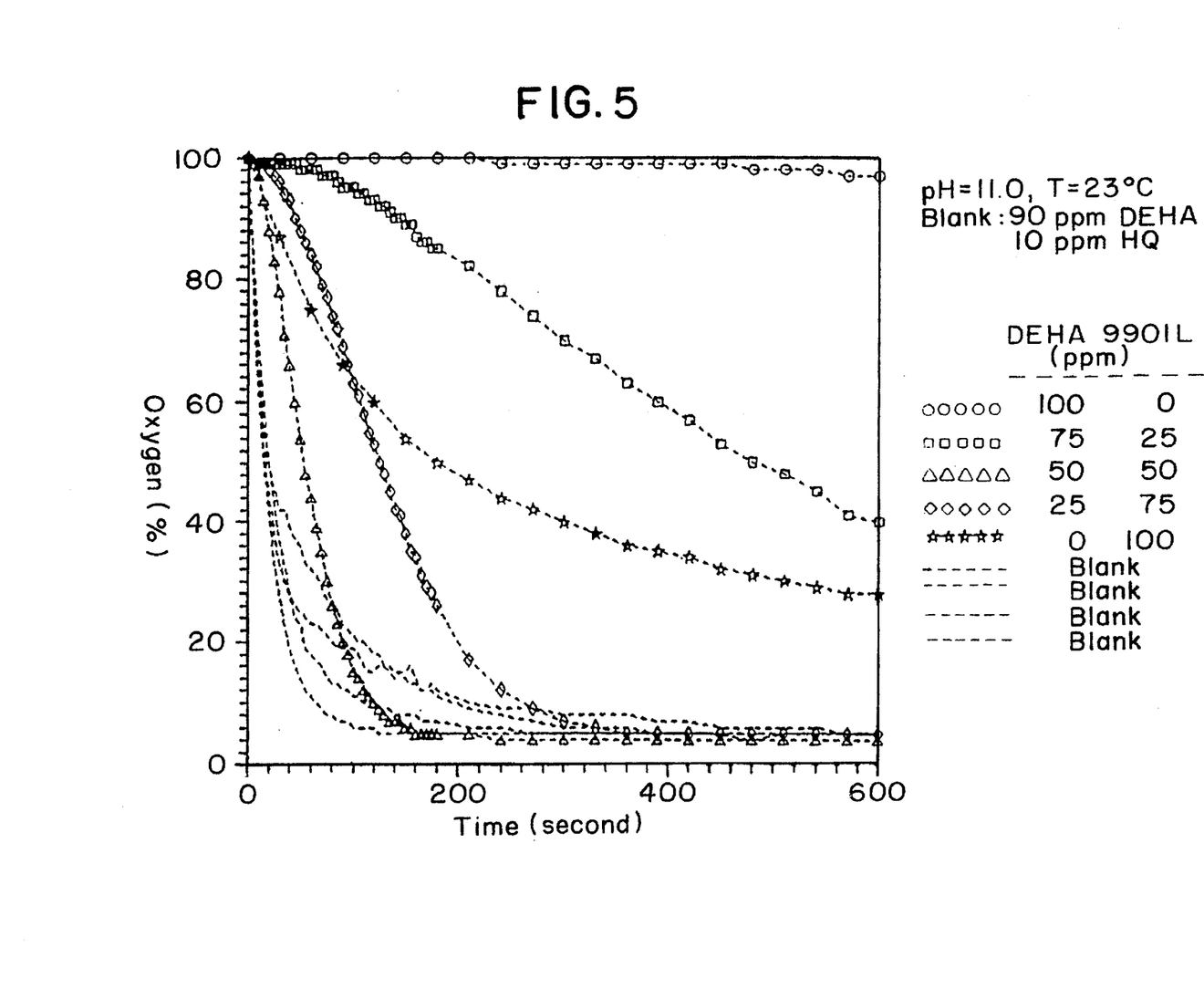
FIGS. 5–7 illustrate oxygen removal rates for various combinations of a synthetic tannin and DEHA.
Figure 8:
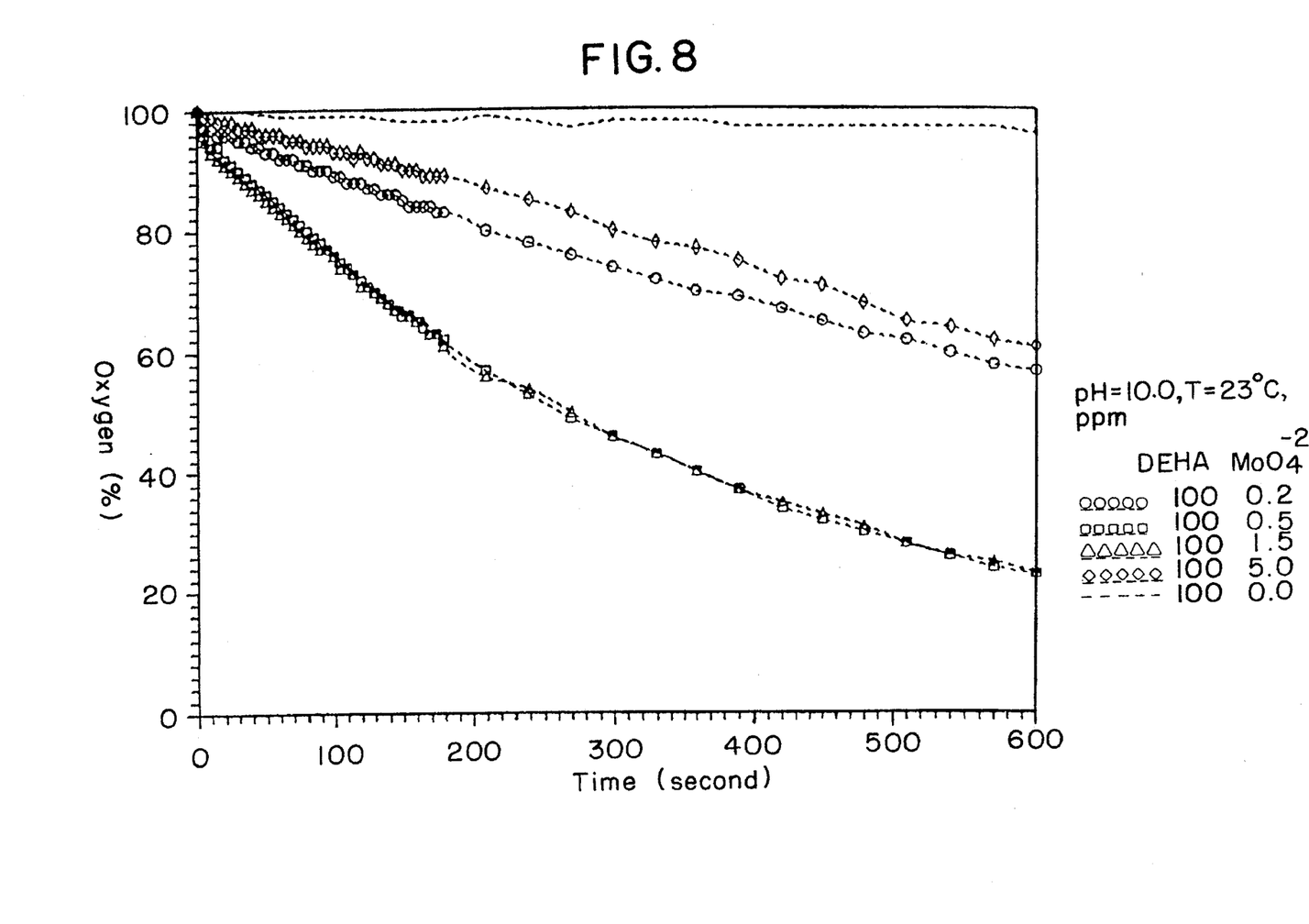
FIG. 8 illustrates the synergistic effect of combinations of molybdate and DEHA.
Figure 9:
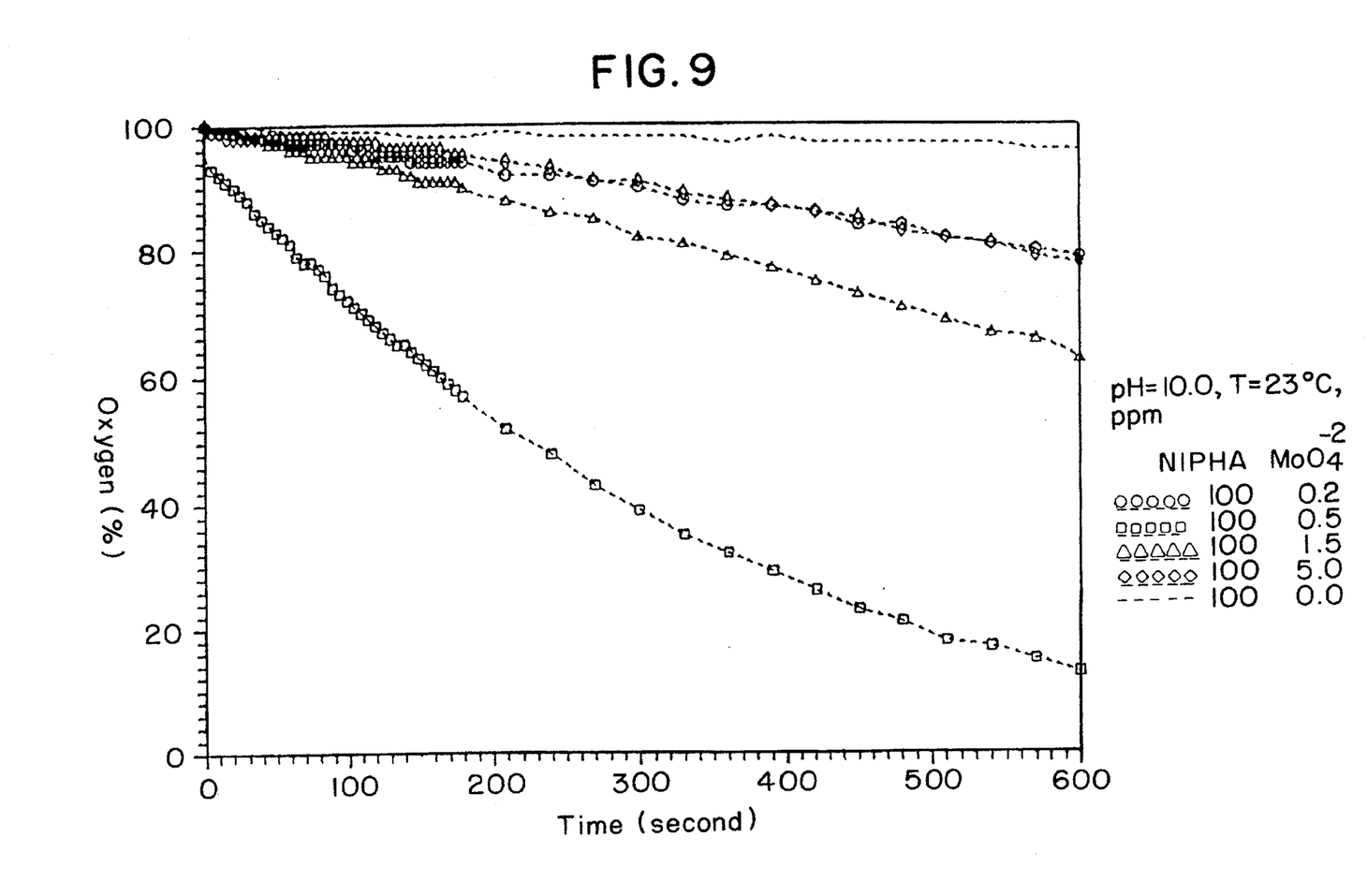
FIG. 9 illustrates the synergistic effect of combinations of molybdate and NIPHA.

In further experiments using a different laboratory rig, oxygen removal rates were examined for various combinations of Resorcinex 9901L and DEHA. This involved demineralised water saturated with air for 10 minutes to an oxygen concentration of about 8.3 ppm. The pH was then adjusted as required with sodium hydroxide solution and the additives incorporated with subsequent readjustment of the pH if necessary. The results obtained are shown in FIG. 5. It can be seen that the best results were obtained with a 50:50 mixture. FIGS. 8 and 9 show the synergistic effect of combinations of molybdate (sodium molybdate) and DEHA or NIPHA. The effectiveness of using Resorcinex 9901L without DEHA can also be seen i.e. sulphonated tannins are effective oxygen scavengers.

At pH 11.0 Resorcinex 9901 L/DEHA at 50/50 ratio shows lower initial scavenging rate compared to that of DEHA/HQ at 90/10 ratio. However, the remaining oxygen levels drop to the same level at 160 seconds for these two treatments. Considering the fact that chemicals increase their activities at higher temperature, applying Resorcinex 9901L/DEHA at boiler temperature might exhibit a much more satisfactory oxygen scavenging rate, i.e., its activity could approach the activity of DEHA/HQ.

Figure 6:
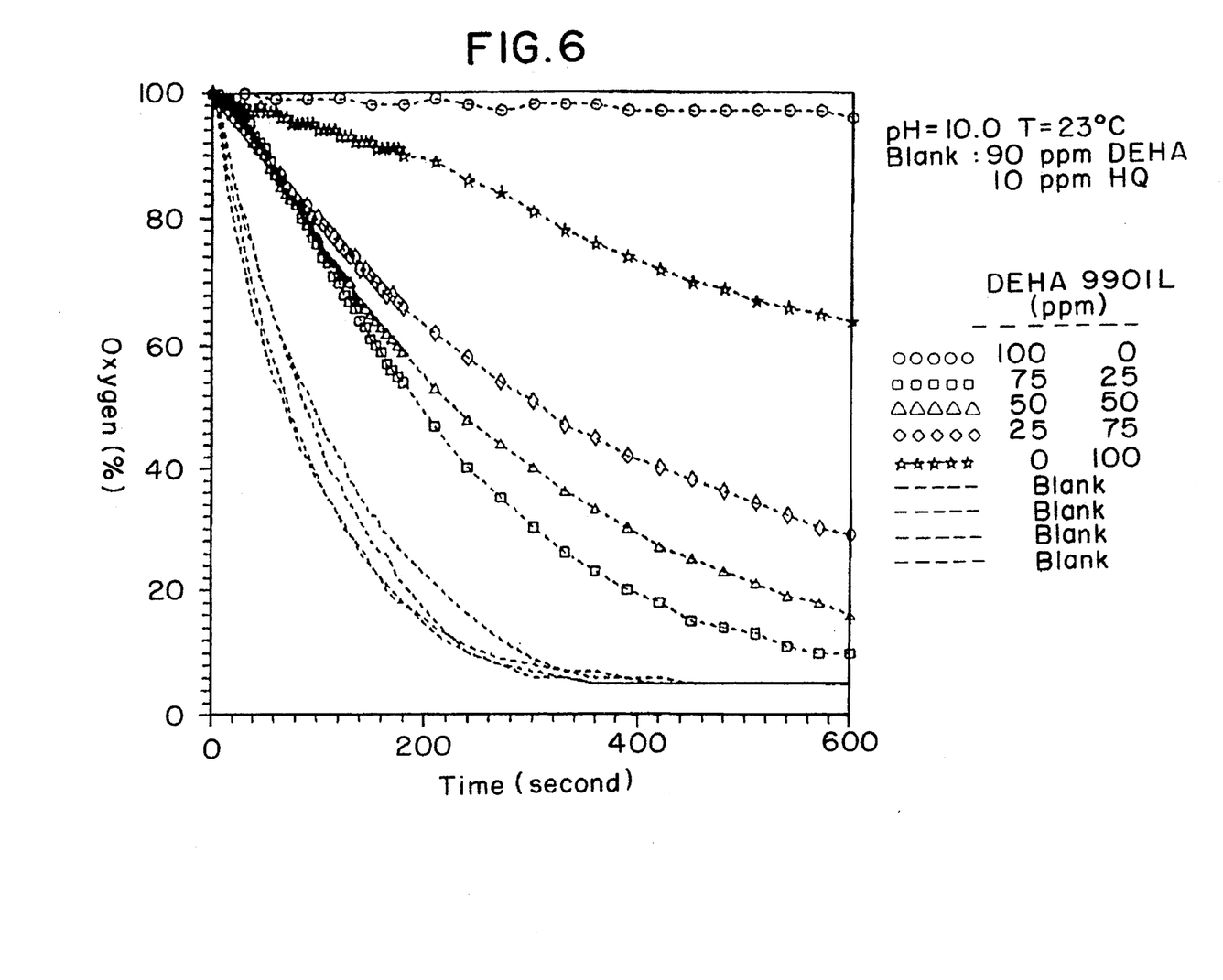
Figure 7:
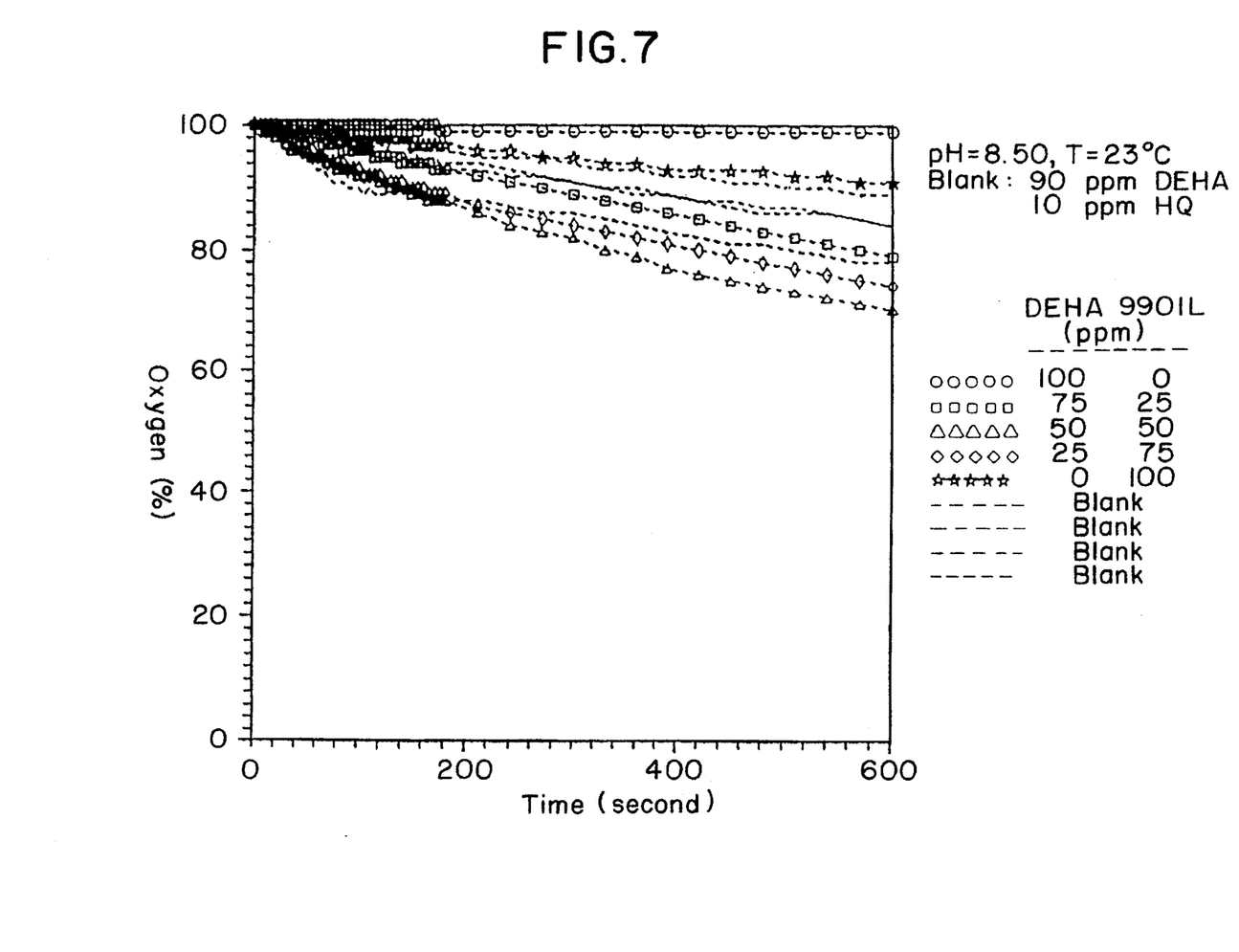

Works done at pH 10.0 and 8.50 also demonstrate the synergistic nature of these two chemicals. As shown in FIG. 6, the maximum performance is achieved at a 3:1 Resorcinex 9901L to DEHA ratio at pH 10.0, while FIG. 7 shows the best performance is achieved at a 1:1 Resorcinex 9901L to DEHA ratio at pH 8.50. It is obvious that mixing Resorcinex 9901L with DEHA as a 50/50 mixture results in highest activity.

We claim:

1. A method for the treatment of an aqueous system which comprises incorporating into the system (i) at least one member of the group consisting of (a) hydroxylamine or its derivatives, (b) water soluble salts and (c) precursors thereof the formula:

wherein $R_1$, $R_2$ and $R_3$, which may be the same or different, is a member of the group consisting of hydrogen, alkyl of 1 to 8 carbon atoms, and aryl, and (ii) tannin wherein (i) and (ii) are in a weight ratio of at least 2:1.

2. A method according to claim 1 in which at least one of $R_1$, $R_2$ and $R_3$ is a member of the group consisting of hydrogen, ethyl and isopropyl.

3. A method according to claim 1 in which the hydroxylamine derivative is a member of the group consisting of hydroxylamine, N,N-diethylhydroxylamine and N-isopropylhydroxylamine.

4. A method according to claim 1 in which a precursor of a hydroxylamine or hydroxylamine derivative is incorporated into the aqueous system wherein said precursor is an oxime or nitrone.

5. A method according to claim 1 in which the hydroxylamine is a member of the group consisting of N-hydrocarbylhydroxylamine, a N,N-dihydrocarbylhydroxylamine and mixtures thereof.

6. A method according to claim 1 in which the tannin is a member of the group consisting of mimosa, chestnut and quebracho.

7. A method according to claim 1 in which 1 to 70 parts of hydroxylamine derivatives are present per part of dissolved oxygen.

8. A method according to claim 7 in which from 2 to 20 parts of hydroxylamine derivative are present per part of dissolved oxygen.

9. A method according to claim 1 in which the weight ratio of hydroxylamine derivative to tannin is from 2:1 to 200:1.

10. A method according to claim 9 in which the said weight ratio is from 3:1 to 20:1.

11. A method according to claim 1 in which the components are incorporated the aqueous system at a temperature of 15° to 80° C.

12. A method according to claim 1 wherein the aqueous system is a boiler water system.

13. A method for the treatment of an aqueous system which comprises incorporating in the system a hydroxylamine, hydroxylamine derivative, water soluble salt thereof, or a precursor thereof, as defined in claim 1 and a molybdate.

14. A method according to claim 1 wherein the tannin comprises a polyphenolic compound selected from the group consisting of compounds having the following formulas I and III:

and wherein R is hydrogen or hydroxyl.

* * * * *